Patented Oct. 27, 1936

2,058,832

UNITED STATES PATENT OFFICE 2,058,832

INSECTICIDES CONTAINING DERRIS EXTRACTS AND METHODS OF PREPARING THE SAME

Nicholas A. Sankowsky, New Providence Township, Union County, N. J., assignor to Stanco Incorporated No Drawing. Application March 17, 1933, Serial No. 661,355

2 Claims. (Cl. 167—24)

This invention relates to the preparation of improved insecticides and relates particularly to methods of preparing concentrated petroleum oil solutions of the active principles extracted from plants containing rotenon, tephrosine, deguelin, toxicarol and products obtained therefrom.

Rotenon and other constituents of the same plants generally known as fish poison plants are used in insecticides. Plants such as deguelia (derris) elliptica, certain species of South American lonchocarpus such as cube, haiari and timbo, tephrosia toxicaria, tephrosia vogelli, and various other plants are the main source of supply of rotenon and the other insecticidal constituents which will hereafter be known as rotenoids.

It is well known that low boiling petroleum hydrocarbons such as naphtha, kerosene, etc., are poor solvents for rotenon and rotenoids. Kerosene which has been deodorized and does not contain aromatic and unsaturated compounds and is desirable in fly spray preparations is specifically a poor solvent.

An object of this invention is to provide a petroleum distillate solution, such as of kerosene, that may be used for extracting rotenon and rotenoids from derris, cube and other plants containing rotenon.

Another object of this invention is to provide a method of preparing a concentrated solution of a petroleum distillate containing over 2.5% of rotenon and rotenoids.

These and other objects of this invention will be understood from the following descriptions of the methods used in preparing the concentrated solutions of rotenon and rotenoids.

Derris root, cube root or other plants containing rotenon are extracted by a counter-flow method, or by percolation, etc., with about 20 to 30% solution of ethylene dichloride in a petroleum distillate. A concentrated extract is obtained containing about 2.5% of rotenon and about 5% of rotenoids. This concentrated extract, after being clarified if turbid by the addition of a small amount of ethylene dichloride or other similar solvent, may be used for the preparation of insecticidal solutions by diluting with a petroleum distillate to the strength desired without the formation of a residue, or it may be first mixed with a concentrated solution of other insecticides and then diluted to the desired strength. The petroleum distillate preferably used is one having a maximum boiling point below 625° F.

Other solvents were found that may be used mixed with a petroleum distillate to extract rotenon and rotenoids from derris root, cube root or other plants containing rotenon, which are as follows: acetone, benzol, chlorobenzene, chloroform, dichloroethyl ether, ethylene chlorohydrin, n-propyl formate, toluene, trichloroethylene and xylene.

These solvents are used similarly as in the example given above. The amounts of solvent mixed with the petroleum distillate are varied as more or less of the solvent may be required, depending on the solvency of the mixture for rotenon and rotenoids and the rotenon and rotenoid content of the plants though in most cases at least 50% of the solution consists of a petroleum distillate. In some cases it may be desirable to use a mixture of more than one of the above solvents with the petroleum distillate.

The extraction of derris root, cube root, or other plants containing rotenon may be made at an elevated temperature with a mixture of kerosene and one or more of the above named solvents. A concentrated solution is obtained which, on cooling, is turbid. This turbid solution may be clarified by the addition of suitable amounts of para-dichlorobenzene or one or more of the above named solvents.

These concentrates are especially adapted for preparing fly sprays or other insecticides by diluting with more of the petroleum distillate with or without the addition of more of the solvents, or by mixing with pyrethrum concentrate or other insecticidal preparation and diluting to the required strength to prepare an improved insecticide. The concentrate may also be used in fortifying petroleum distillate insecticides already prepared.

The foregoing description is merely illustrative and various changes and alternative arrangements may be made within the scope of the appended claims in which it is my intention to claim all novelty inherent in the invention as broadly as the prior art permits.

I claim:

1. A method for preparing a clear concentrated liquid insecticide which comprises extracting rotenon, and other constituents toxic to insects, from a plant containing such toxic substances, by treating said plant with a mixed solvent, which is capable of selectively dissolving said toxic substances to the exclusion of resinous materials which, upon dilution of the extract with kerosene, would be precipitated, comprising a petroleum distillate having a maximum boiling point below 625° F. and a sufficient amount of an organic solvent soluble in the petroleum distillate and having solvent power for said toxic substances to dissolve at least 2½% of said toxic substances.

2. A method according to the preceding claim in which the organic solvent is ethylene dichloride and constitutes from 20 to 30% of the mixed solvent.

NICHOLAS A. SANKOWSKY.